(12) United States Patent
Jacobs et al.

(10) Patent No.: US 11,658,831 B2
(45) Date of Patent: May 23, 2023

(54) VALIDATION OF THE INTEGRITY OF DATA

(71) Applicant: The Ascent Group Ltd, Monmouth (GB)

(72) Inventors: Michael Stuart Jacobs, Monmouth (GB); James Zorab, Monmouth (GB)

(73) Assignee: The Ascent Group Ltd, Monmouth (GB)

( * ) Notice: Subject to any disclaimer, the term of this patent is extended or adjusted under 35 U.S.C. 154(b) by 155 days.

(21) Appl. No.: 16/088,604

(22) PCT Filed: Mar. 30, 2017

(86) PCT No.: PCT/GB2017/050896
§ 371 (c)(1),
(2) Date: Sep. 26, 2018

(87) PCT Pub. No.: WO2017/168159
PCT Pub. Date: Oct. 5, 2017

(65) Prior Publication Data
US 2019/0103975 A1 Apr. 4, 2019

(30) Foreign Application Priority Data

Mar. 30, 2016 (GB) ..................... 1605343

(51) Int. Cl.
*H04L 9/00* (2022.01)
*G06F 21/64* (2013.01)
(Continued)

(52) U.S. Cl.
CPC ............ *H04L 9/50* (2022.05); *G06F 16/9014* (2019.01); *G06F 21/602* (2013.01); *G06F 21/64* (2013.01); *H04L 9/3239* (2013.01)

(58) Field of Classification Search
CPC . H04L 9/3236–3242; H04L 63/12–126; H04L 2209/38; G06F 16/2255;
(Continued)

(56) References Cited

U.S. PATENT DOCUMENTS 5,781,629 A 7/1998 Haber et al.
5,956,404 A 9/1999 Schneier et al.
(Continued)

FOREIGN PATENT DOCUMENTS

CN 1174642 A 2/1998
CN 101507178 A 8/2009
(Continued)

OTHER PUBLICATIONS

International Search Report and Written Opinion dated Jun. 29, 2017 from counterpart international application No. PCT/GB2017/050896, 10 pp.
(Continued)

*Primary Examiner* — Jeremy S Duffield
(74) *Attorney, Agent, or Firm* — Shumaker & Sieffert, P.A.

(57) ABSTRACT

A computer-implemented method of permitting authentication of data added to an initial plurality of unique data items stored on a computer, all of the data items being converted via a one-way function to respective equal length unique digests (or hashes); and the hashes being stored as a linked dataset in which the value of each successive hash is dependent on the value of the previous hash combined with a new hash resulting from the hashing of the most recently added data. The most recent hash in the linked dataset (hash chain) is the cumulative result of all previous hashes in their original sequence, each hash in the dataset being unique to the most recently added data. Each cumulative hash is constructed by incorporating one or more pre-existing
(Continued)

cumulative hashes into the source data, before the new hash is calculated.

9 Claims, 3 Drawing Sheets

(51) Int. Cl.
*H04L 9/32* (2006.01)
*G06F 16/901* (2019.01)
*G06F 21/60* (2013.01)

(58) Field of Classification Search
CPC .. G06F 16/2365; G06F 16/9014; G06F 21/64; G06F 21/602
See application file for complete search history.

(56) References Cited

U.S. PATENT DOCUMENTS

| | | | |
|---|---|---|---|
| 10,158,480 B1* | 12/2018 | Winklevoss | H04L 12/2803 |
| 10,579,974 B1* | 3/2020 | Reed | G06Q 20/065 |
| 2005/0114666 A1 | 5/2005 | Sudia | |
| 2006/0143462 A1* | 6/2006 | Jacobs | H04L 63/08 |
| | | | 713/181 |
| 2009/0006853 A1* | 1/2009 | Li | H04L 67/108 |
| | | | 713/176 |
| 2009/0328218 A1 | 12/2009 | Tsurukawa | |
| 2010/0088512 A1* | 4/2010 | Schwartz | G06F 16/958 |
| | | | 713/168 |
| 2010/0088522 A1* | 4/2010 | Barrus | H04L 9/3242 |
| | | | 713/181 |
| 2012/0096564 A1 | 4/2012 | Li | |
| 2012/0233658 A1* | 9/2012 | Piersol | G06F 21/64 |
| | | | 726/2 |
| 2013/0276058 A1* | 10/2013 | Buldas | H04L 63/0876 |
| | | | 726/2 |
| 2014/0281354 A1 | 9/2014 | Tkacik et al. | |
| 2014/0298034 A1* | 10/2014 | Watanabe | H04L 9/3236 |
| | | | 713/176 |
| 2015/0188715 A1* | 7/2015 | Castellucci | H04L 9/3265 |
| | | | 713/178 |
| 2016/0134495 A1* | 5/2016 | Banescu | G06F 11/3476 |
| | | | 709/224 |
| 2017/0126410 A1* | 5/2017 | Maximov | H04L 9/006 |

FOREIGN PATENT DOCUMENTS

| | | |
|---|---|---|
| CN | 102413313 A | 4/2012 |
| EP | 2897051 A2 | 7/2015 |
| WO | 2017168159 A1 | 10/2017 |

OTHER PUBLICATIONS

Combined Search and Examination Report under Sections 17 and 18(3) dated Apr. 11, 2017 from counterpart GB application No. 1605343.1, 7 pp.
International Preliminary Report on Patentability from International Application No. PCT/GB2017/050896, dated Oct. 11, 2018, 7 pp.
Response to Communication under Sections 17 and 18(3) dated Apr. 11, 2017 for corresponding UK Patent Application No. 1605343.1, filed Mar. 23, 2018, 4 Pages.
Response to Communication under Section 18(3) dated Apr. 20, 2018 for corresponding UK Patent Application No. 1605343.1, filed Apr. 27, 2018, 7 Pages.
Response to Communication Pursuant to Rules 161(1) and 162 EPC dated Nov. 7, 2018 for corresponding European Patent Application No. 17715988.6, filed Jan. 25, 2019, 10 Pages.
Response to Australian Office Action dated Mar. 18, 2021, from counterpart Australian application No. 2017243206, filed Jun. 8, 2021, 12 pp.
Notice of Acceptance from counterpart Australian Application No. 2017243206, dated Jul. 5, 2021, 6 pp.
First Examination Report from counterpart Australian Patent Application No. 2017243206, dated Mar. 18, 2021, 4 pp.
English translation of Office Action from counterpart Chinese Application No. 201780031290.8 dated Aug. 4, 2021, 13 pp.
Office Action from counterpart Chinese Application No. 201780031290.8 dated Mar. 29, 2022, 20 pp.

* cited by examiner

VALIDATION OF THE INTEGRITY OF DATA

This application is a U.S. national phase application under 37 U.S.C. § 371 of international application number PCT/GB2017/050896 filed on Mar. 30, 2017, which claims the benefit of priority to GB application number 1605343.1 filed Mar. 30, 2016. The entire contents of each of international application number PCT/GB2017/050896 and GB application number 1605343.1 are incorporated herein by reference.

TECHNICAL FIELD

The present disclosure concerns methods and apparatus for validating the integrity of data by using a hash chain both to affirm the integrity of individual data items and to protect the internal integrity of the hash chain.

BACKGROUND

Many circumstances exist in which it is desirable to validate the integrity of data which may be contained, say, in a document or another file which is to be exchanged between parties or to be published. It is frequently important that such data should be trustworthy when it is exchanged or published—so various techniques for validating the integrity of data (sometimes referred to as "authentication") have been employed for several years.

In conventional techniques for validating the integrity of data, it is known to produce hash chains consisting of a series of hashes, derived from source data and each created by concatenating the most recently created hash in the chain with a newly submitted source hash, and then hashing the result—which then becomes the new "most recent (or last) hash in the chain".

Such simple concatenation is generally of use only to an organisation which has access to every document or data item whose hash has contributed to the chain. The organisation could use the chain to confirm that every such document has preserved its integrity (or, in the alternative, that something has changed). Furthermore, if data in the middle of the chain was missing or had been illicitly amended, the rest of the chain could not be rebuilt, unless a separate record of the original individual source hashes had been kept elsewhere, rendering the protection from that point of illicit amendment null and void.

SUMMARY

In order to create a more widely useful hash table, EP1678666B1 describes a system in which the individual source hashes are publicly searchable and the table is protected by wide distribution of its end of day hashes in a reputable journal of record. Use of this system means that any third party could verify data just by confirming that its hash existed on the central database and confirming that day's data matched its printed hash. It also means that an attempt to alter a hash that has been recorded prior to print publication would be detectable because the verification would fail.

In more detail, EP1678666B1 discloses a (computer-implemented) method of permitting authentication of data, which comprises the steps of: storing copies of a plurality of data items, generating at the end of a predetermined time period a first data file comprising a respective hash value of each of the plurality of stored data items, and generating a single hash value of the first data file derived from said hash values of the plurality of stored data items, and then transmitting the single hash value to a remote location, via an information technology communications network; creating at the remote location a second data file comprising the single hash value and one or more additional data items relating to the single hash value, and publishing the second data file in a reputable journal (or journal of record), the published second data file being such as to permit regeneration of the single hash value of the first data file and reconversion to the second data file for comparison with the second data file previously created.

In the known method just described, for a given audit period, a batch of hash values is produced of each of a batch of data and a single hash value is generated based on that batch of hash values. The single hash value is transmitted to a receiver where a data file is produced for the dated audit period, the data file comprising the single hash value and one or more additional data items relating to the single hash value. Then an identifying hash value is generated for that data file, the identifying hash value being published in a dated journal which thus permits the date of the data file to be authenticated at a later date.

Such an authentication method is available commercially, as is described, for example, at the website www.codelmark-.co.uk/about. The services available via that website under the name CODEL (CODEL is a registered trade mark) permit an author to generate a unique "fingerprint" of data that the author generates, in which a hash value is generated from the data (the generated hash value being unique to that data), and that hash value is stored in a database where it can be accessed by an individual who wishes to validate the data, either before or after reading it.

The process of generating the hash value can be considered to be unstable, in the sense that even a small change to the data inevitably generates a (significant) change to the hash value. This means that the hash value can be used to verify the integrity of data at a specific point in time; even the addition of just a small change to the data, like a full-stop or a comma placed into a document, can generate a large change in the resulting hash value.

The manipulation of generated data may be attractive to certain parties, and therefore the manipulation of hash values would also be attractive, because it is the hash value which can be used to assert the integrity of data in the event that a third party attempts to "amend" that data and its related hash.

When data is exchanged between parties in order to, say, publish that data online or distribute that data to a wider audience, the author or producer of the data may choose to register that data with the "Codel" service described above in order to generate a hash value for the data that can be used by readers to validate both integrity of the data and the time at which it was registered with that hash value.

The reliance on such a hash value, as proof of integrity, means that any illicit attempt to amend the relevant data source must be accompanied by an attempt to amend its registered hash value, in order to sustain any deception. This entails an attack on the central database. It might be possible for such an attack to succeed for the period following the publication of the most recent end of day hash. All records created between that point and the next publication could, potentially, be altered by an attacker in control of the database, without detection. The period from the registration of any given hash and the point at which it can be trusted is referred to, in the field, as Verification Latency. Only after the end of day hash is printed in a reputable journal can the records registered during that day be safely trusted.

Following on from that, one of the issues with current arrangements, such as the one described in the abovementioned EP1678666B1, is that it is very difficult to tell whether a server on which hashes are being registered is under attack between print publications. Due to this difficulty, users of a server may continue to register new hashes with a server, unaware that it has been compromised. Attacks on the server may seek to make unauthorised amendments to or retractions of registered data. It is therefore highly desirable to identify attacks in progress at the earliest opportunity.

Another issue with the system described in the abovementioned EP1678666B1 is that the action of confirming that a day's data matches its printed hash in the reputable journal (or journal of record) is not a trivial procedure.

This confirmation is essential for full formal validation in order to prove that the database itself has not been amended. This is formally achieved, in the original design, by obtaining a copy of all the data for a given day and confirming that, when the collection is hashed, with or without a chain, the result matches the copy in the journal of record. However, most parties seeking validation do not even consider validating the host table themselves and rely instead on the hosts of the database carrying out such checks on the host server on their behalf. But this reliance fails to account for the possibility that potential attackers may have gained illicit or unauthorised control of the host server, or even that the hosts themselves may have become corrupt.

There may furthermore be practical obstacles to the use of the known validation method, particularly for older data, as the process of gathering the data and finding copies of the relevant printed publication of the journal of record might take days or weeks—and even though an amendment would eventually be exposed, the attacker might be long gone with the proceeds of their deception.

The principal purpose of the present disclosure is therefore to reduce the window of opportunity for such attacks on the growing chain by guaranteeing detection, typically within a few seconds, and to make it possible to conduct full verification of any item on the database, regardless of its age, typically within a minute or so.

This significantly reduces the window of opportunity for an attacker and renders it possible for an attack to succeed only if the attack can be completed in a very short time and only if during that short time the attacker is able to block all attempts to add new records to the chain from sources not under the attacker's control. Such blocking would inevitably interrupt normal service which would render the attack highly visible.

The present disclosure, like the method described in the abovementioned EP1678666B1, provides a computer-implemented method of and system for permitting validation of the integrity of data.

The method according to the disclosure comprises a computer-implemented method of permitting validation of the integrity of data by reference to a plurality of unique data items stored or recorded on at least one computing device, wherein each such data item is the result of operating a one-way function on respective data to create respective equal length unique digests and combining each new digest with its predecessor (the creation of such digests by means of such a one-way function being referred to herein as hashing and the individual resulting digests being referred to herein as hashes); and the hashes are then stored on the computing device as a linked dataset in which the value of each successive hash, except for the first, is dependent on the value of the previous hash combined (for example by concatenation or bitwise excusive OR operation) with a new hash resulting from the hashing of new data that has itself been combined with a different previous hash, wherein the most recent hash in the dataset is the cumulative result of all previous hashes in their original sequence (a linked dataset including such a cumulative result being referred to herein as a hash chain, and the cumulative hashes on the hash chain being referred to herein as HASH_LINKED), each hash in the dataset being unique to the most recently added data.

As indicated, at least one computing device is used; that computing device may in some embodiments be a single computing device or it may in other embodiments be a plurality of computing devices arranged or programmed to operate together.

The present disclosure further describes apparatus suitable for cat tying out the method according to the disclosure, the apparatus comprising at least one storage device containing a plurality of data sources, an input via which the data content of the data sources can be added to the storage device, a processor programmed to convert all of the data content of the data sources by reference to a plurality of unique data items stored or recorded on at least one computing device, the data items being the result of (i) hashing a respective data source and (ii) combining each new hash with its predecessor, the processor being programmed to store the hashes as a linked dataset in which the processor applies a value to each successive hash which is dependent on the value of the previous hash combined with a new hash resulting from the hashing of a new data source that has itself been combined with a different previous hash;

the processor being further programmed such that the most recent hash in the dataset is the cumulative result of all previous hashes in their original sequence, and such that each hash in the dataset is unique to a new data source.

In a preferred embodiment, the hash chain is produced by the following sequential steps:

(a) combining at least one of the HASH_LINKEDs, preferably 3 (selected as described below) already recorded on said hash chain with a newly added data source and hashing the resulting combination to produce a new hash (referred to herein as HASH_SALTED);

(b) storing the HASH_SALTED to a new location (herein referred to as a field within a new record) in a digital data store (herein referred to as a table within a database) on the at least one computing device; and (c) combining, in a new record, each new HASH_SALTED with the most recent HASH_LINKED and hashing the combination to produce a further HASH_LINKED stored to another field in the same new record, such that the most recent HASH_SALTED and the further HASH_LINKED are permanently linked by position in the database;

steps (a) to (c) being repeated in multiple iterations, wherein following each repeat of step (a), each most recent HASH_LINKED is combined, in a new record, with a new HASH_SALTED and hashed to produce a succeeding further HASH_LINKED, stored in the same new record.

In a first preferred embodiment of the disclosure, at periodic intervals, a further record (referred to herein as a BLOCK CONFIRMATION RECORD) is created, by hashing a combination of a previous HASH_LINKED and a file containing all the records created since the previous BLOCK CONFIRMATION RECORD so as to create a new HASH_SALTED to be stored in a new record at a pre-determined position within the stored hash chain; where the value of the new HASH_SALTED is combined with the most recent HASH_LINKED on the hash chain to produce a new most recent HASH_LINKED stored in the same new record.

The embodiment just described is believed to be novel per se featuring, as it does, recursive use of the hash chain to protect sections of the hash chain.

In a second preferred embodiment of the disclosure, production of each successive HASH_LINKED is randomly verified in one or more of the following ways:

by agents, which may be virtual (digital) or human, seeking to authenticate arbitrary data items;

(ii) by agents programmed to perform random verifications;

(iii) by agents (such as the members of a peer to peer network) performing periodic or random verifications; or (iv) by agents adding new records; such that verification occurs at least at the same frequency as iterations of steps (a) to (c), and an alarm message is raised if the verification action produces a negative result.

This embodiment is also believed to be novel per se in that it ensures that chain integrity is tested at least as often as it is updated.

In a third preferred embodiment of the disclosure, a recent HASH_LINKED in the hash chain is further combined with an instantaneously created data item, such as a digital image, with the resulting combination being hashed to form a new HASH_SALTED, which is in turn stored in the database or a further database at the first available opportunity. This embodiment is also believed to be novel per se in that it significantly reduces the opportunity to manipulate images prior to registration.

In some embodiments, it is preferred that the HASH_SALTED further includes a short string of random data. Such a short string of random data is known, in the field, as cryptographic SALT; such a short string will be referred to herein as "SALT".

Each HASH_LINKED is incorporated at least once into subsequent data whose resulting HASH_SALTED is incorporated later in the hash chain.

Embodiments of the method according to the disclosure can further enable rapid verification of the integrity of relevant elements of the cumulative hash chain, by the inclusion typically of block, and end of day (or end of session), confirmation records in the hash chain, in order to confirm the integrity of arbitrary sections of the hash chain and thus support the validity of arbitrary source hashes registered on the hash chain.

Embodiments of the method according to the disclosure can further enable a central server (which may take the form of a centralised service hosted by a cluster of major providers forming what might be called a "super-peer" network or highly optimised Peer to Peer (P2P) network) to be protected from internal attack, through continuous monitoring and testing of the performance of the central server by a P2P network using appropriate local client software to measure the response times of the server and to confirm congruence between data held by the client and data held on a central or remote server.

The present disclosure can be summarised as being a "threaded hash chain" in which two key features distinguish the resulting hash chain from previous (known) hash chains. Firstly, earlier elements of the hash chain are combined with new local source data when their individual hashes are calculated prior to their inclusion in the growing hash chain. This mechanism significantly impedes attempts to attack the chain internally. Secondly, periodical "confirmation" records, being somewhat analogous to the known "blockchain" concept (although with a radically different origin and purpose) may be added at fixed intervals to the hash chain. Such intervals may be defined, for example, by predetermined fixed periods of time, or predetermined fixed amounts of data.

These confirmation records can provide the ability to verify any record within the hash chain, however old, including the crucial verification that the chain itself remains intact, within, at most, a couple of minutes and, optimally, within a few seconds.

In addition to these modifications to the hash chain, a peer to peer (P2P) network can provide the role of the guardian of the central or remote server.

A further consequence is that embodiments of the method according to the disclosure enable a significant increase in the confidence it is possible to impart concerning the validity of instantaneously created or captured digital data, such as images captured by digital cameras.

By entangling the images with the most recent cumulative hash value on the hash chain, and uploading the hash value of such entangled images as soon as the images are taken, or at the first available opportunity after then, the method according to the disclosure can enable proof that a given photograph must have been taken between the times indicated by the respective time-stamps of the first and second hash values; this can dramatically reduce the time available for any kind of image manipulation outside the camera.

Finally, embodiments of the method according to the present disclosure can help achieve similar levels of trust (for the integrity of data) based on the widespread adoption of notarised documents (whose data integrity is protected by the modified hash chain and vice versa). Each notarised data source can be regarded, in a small way, as its own "journal of record" which carries with it the trust appropriate to the relevant notary. But the collection of such notarised data forms a significant pool of trust which may, in time, be recognised as equivalent or even superior to the traditional journal of record. Thus, the distributed data obtained as a result of the method according to the disclosure, helps to protect the central data store.

The method according to the disclosure may be considered as modified relative to the method described in the abovementioned EP1678666B1 and to standard hash chains, in three main ways, as follows:

1 The way in which individual hashes are prepared prior to inclusion on the hash chain is modified; specifically pre-existing hashes from the hash chain are combined with each new data item in order to create its subsequent hash.

2 The way in which periodic "Confirmation Records" are added to the cumulative hash chain, which verify multiple blocks of records between daily printed confirmations and enable a rapid verification both of the integrity of relevant data items and of the hash chain itself.

3 The implementation of peer to peer (P2P) monitoring of the performance, content and time accuracy of the server in order to identify the earliest signs of attack.

The term "hash chain" as used herein refers to the main table in a database which will contain a series of records which include a number of fields, some of which are described below.

The key field contains the cumulative hash value arrived at by the process of combining the cumulative hash stored in the previous record with the modified source hash (HASH_SALTED) of the new record and hashing that combination to create the new cumulative hash. This is the HASH_LINKED referred to above.

BRIEF DESCRIPTION OF THE DRAWINGS

Preferred embodiments of the disclosure will now be described by way of example with reference to the accompanying drawings, in which.

DETAILED DESCRIPTION

Figure 1:
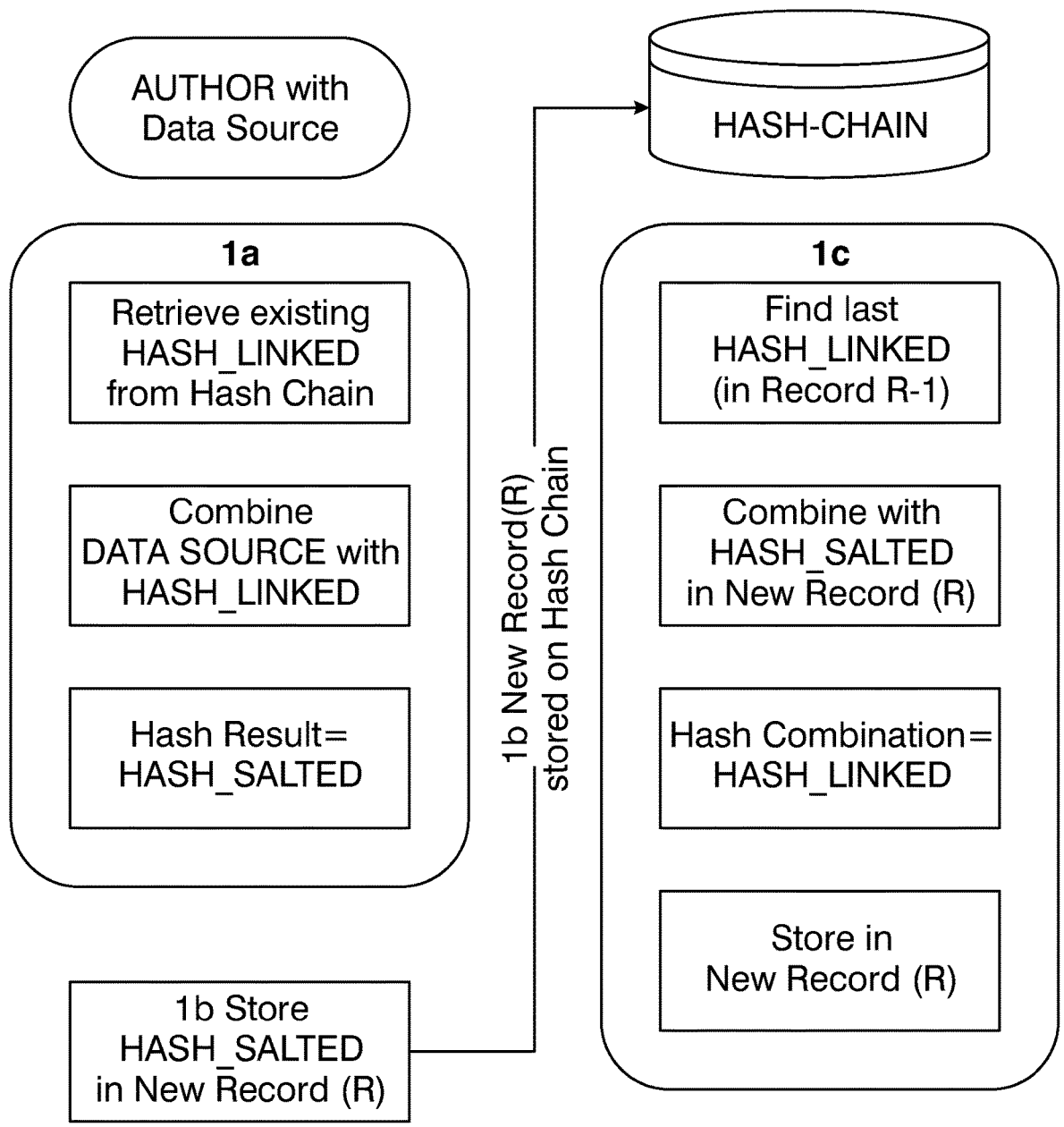
FIG. 1 is a schematic representation of an embodiment of the disclosure in which existing hashes from a hash chain are incorporated into a data source prior to creating new hashes to be added to the chain.
Figure 2:
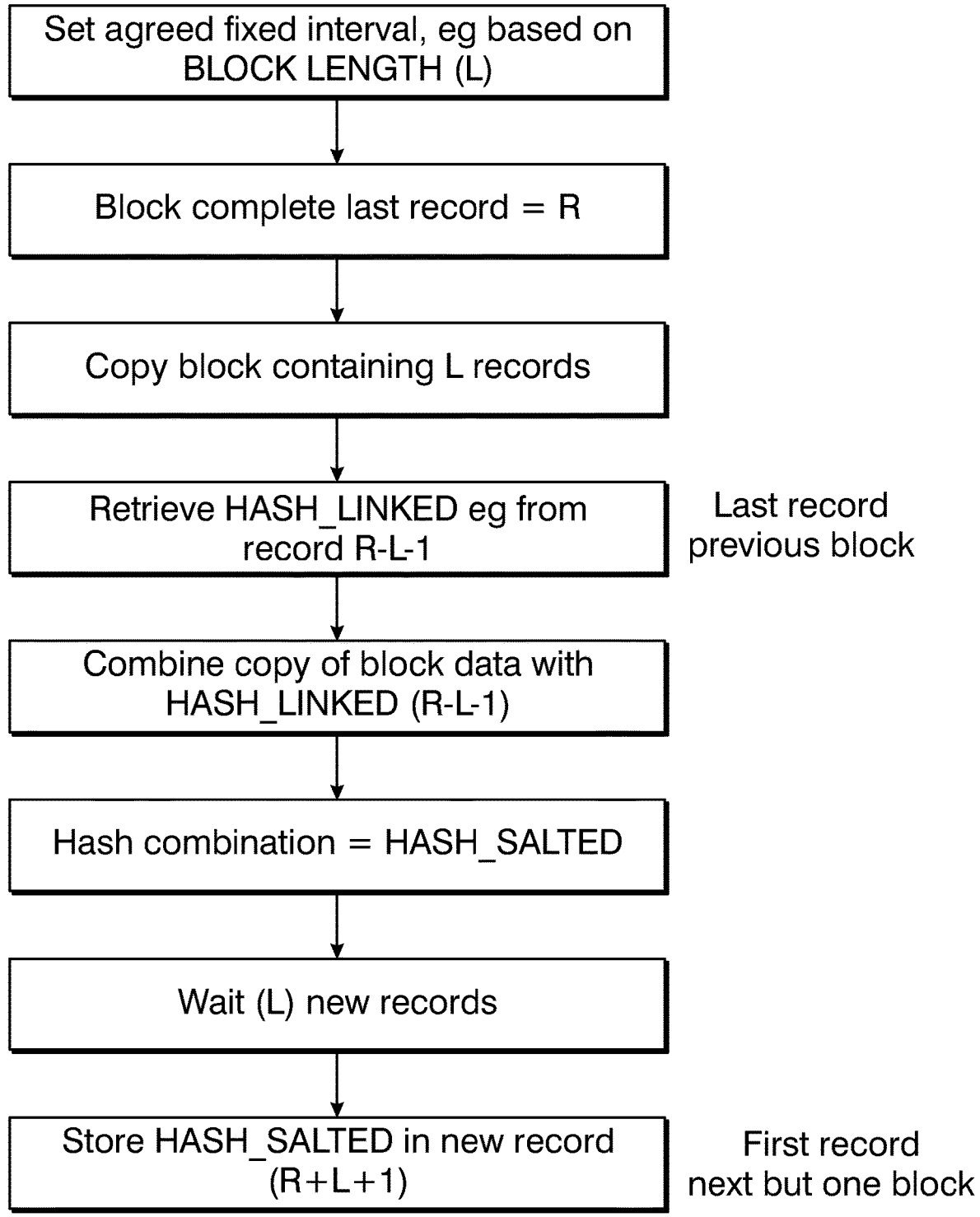
FIG. 2 is a schematic representation of the creation of block confirmation records at fixed intervals in accordance with a preferred embodiment of the disclosure.
Figure 3:
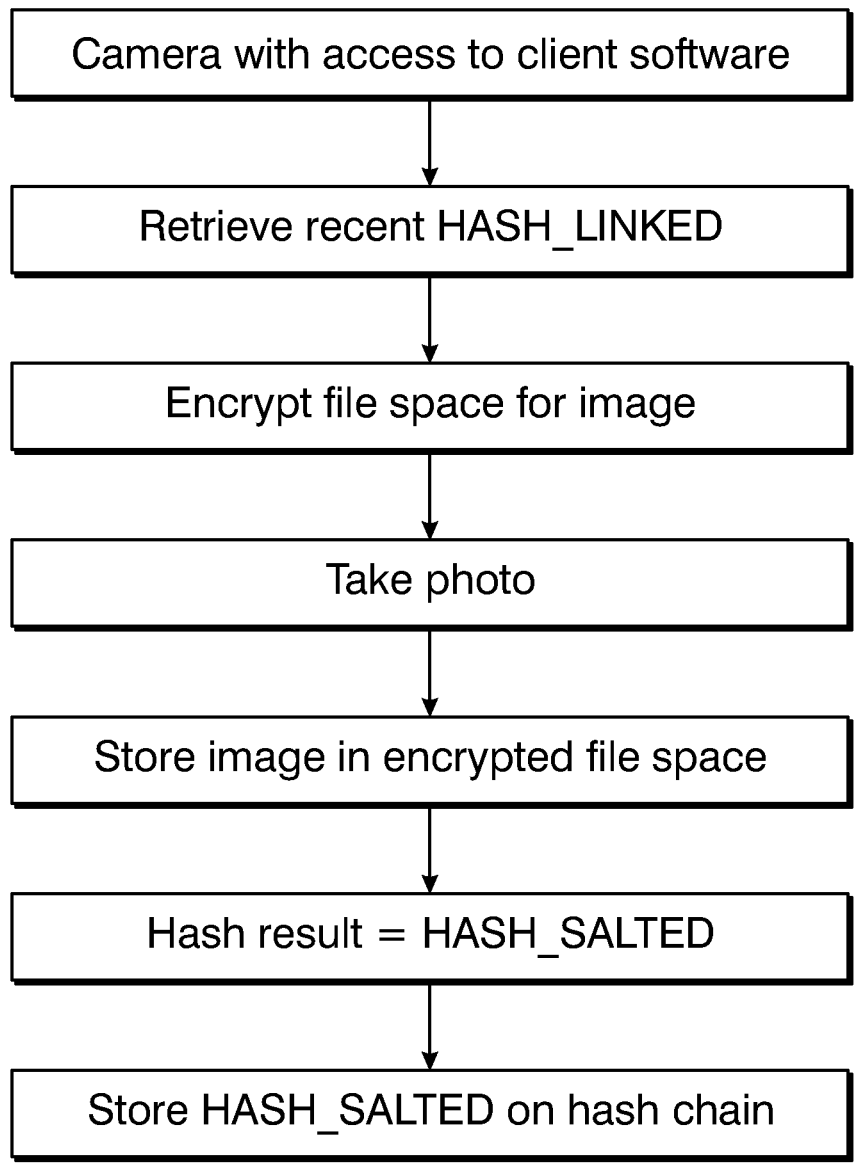
FIG. 3 is a schematic representation of an embodiment of the disclosure in which a recent hash is incorporated into, by way of example, a digital image and the result is hashed to a store on a hash chain.

FIG. 1 shows a sequence, from the top of the left hand column downwards, and then from the bottom of the left hand column to the top of the right hand column, and then from the top of the right hand column downwards; and FIGS. 2 and 3 show respective sequences, from the top of the column downwards.

Referring again to FIG. 1, this shows a series of operations starting with an author's data source.

Existing HASH_LINKEDs (as described above) are retrieved from a hash chain and then combined with the data from the data source. The result is hashed to produce HASH_SALTED which is then stored in a new record (record R) in the hash chain.

Then the HASH_LINKED value in the immediately preceding record (namely record R minus 1) is combined with HASH_SALTED of record R and the new hash combination (new HASH_LINKED) is stored in record R.

Referring again to FIG. 2, this shows a series of operations resulting in the creation of Block Confirmation Records at fixed intervals.

Firstly, a predetermined fixed interval (for example, based on block length L) is set.

The first block contains L records and ends at Record R. Subsequent blocks begin at R+1 and contain the next L records. Each block is then copied to a file as it is completed. The HASH_LINKED value is then retrieved from the last record immediately preceding the most recent block of L records (Record R minus L) and this is combined with the block file data and hashed as a combination to produce HASH_SALTED. Then, after a period of wait for a further block of L new records, the result is stored as the first record in the next but one block, which should be Record R plus L plus 1.

Referring again to FIG. 3, this shows a series of operations incorporating a recent HASH_LINKED into instant data (in this case a digital image) so as to store a new HASH_SALTED on a hash chain.

Specifically a camera is provided with access to appropriate client software and the most recent HASH_LINKED is retrieved. A file space is then encrypted, a photograph taken in the camera and the resulting image stored in the encrypted file space. The result is than hashed to form HASH_SALTED, which is stored, at the earliest opportunity, on the hash chain in the manner described above.

Although all the hashes in the method according to the disclosure will normally be created by using the same hashing algorithm (e.g. SHA 256) and they will, in that sense, all be the same kind of hash, we need to refer to the various hashes by their function or role so we shall define those now.

In the following and preceding description, the term "local" is applied to operations, steps and equipment provided for a user of the method and system, who may at any time wish to validate the integrity of data, while "remote" is applied to a server or database which may be physically separate from a local user, and with connection from the local user being permitted via an information technology communications network.

The standard record on the hash chain will contain a number of fields. The three most functionally important will be referred to many times, and for the purpose of this document, they are referred to as follows:

HASH_SOURCE—the hash of the source document or data item we are trying to protect; HASH_SALTED—as defined above; HASH_LINKED—as defined above.

In the process of registering new data content, which involves adding a new record to the database and calculating its new HASH_LINKED, we make explicit use of earlier HASH_LINKEDs in a manner which is fundamental to the disclosure.

The preferred embodiment features a centralised remote service hosted by at least one (preferably many) internet servers operating collectively a "super peer" network but what we will refer to simply as the "server". This does not preclude hosting the service entirely on a more conventional P2P network provided the required performance can be achieved on such a network.

Authors, owner or publishers (terms we may use interchangeably) wishing to safeguard the integrity of their source data, employ software clients to carry out the tasks described below. Where user choice is required, the clients present the choice to the author and may provide further options, where appropriate, to make the choice response a default so that future registrations proceed past that point automatically.

From here on, it should be understood that unless a user action is explicitly stated, the tasks described are all carried out either by software on the remote server or by the local client.

Protecting the Server from Internal Attack with a Threaded Hash Chain

This first section describes the infrastructure of the data and how the process of adding new records helps to protect the hash chain from the most dangerous potential attack— where the attacker has gained complete control of the server Some further terms relevant to the preferred embodiment will now be defined and illustrated.

HASH_PREVIOUS refers to a Hash drawn from the collection of recently added HASH_LINKEDs which have not yet been combined with later sources to create new HASH_SALTEDs. They are allocated to new registrations on a "First In First Out" basis, so it is always the oldest which is first in the queue.

HASH_PRIOR—refers to any HASH_LINKED which has already been incorporated at least once into later HASH_SALTEDs and so must be prior to those HASH_PREVIOUS records still awaiting their turn for inclusion in future records.

Pseudo-SALT refers to the collection of, preferably, two HASH_PRIORs, a single HASH_PREVIOUS and optional SALT (see above) which are to be combined with source data, in order to create HASH_SALTED Every new HASH_SALTED added to the chain will be created by combining the relevant source data with its pseudo-SALT. The name (pseudo-SALT) is chosen to echo its partial similarity, in function, to "traditional" cryptographic SALT, as well as recognition that, in instances where cryptographic SALT is not used, the pseudo SALT is not as fully protective as "true" SALT would be. "True" SALT is primarily used to increase the difficulty for an attacker in "brute forcing" (a field term used to describe the process of discovering the key to encrypted data or deriving the source data for a cryptographic hash by trying every possible solution until the right answer is found) a guessable plaintext and this remains a possible reason for the inclusion of optional SALT in the pseudo-SALT. That is, some of the source data being protected may well need to remain confidential but, as a guessable plaintext (for example, the choice of candidate from the very limited selection on a voting slip) needs to be protected by obscuring the source of its hash by adding SALT.

This is necessary in such cases as although the mere inclusion of HASH_PRIORs and HASH_PREVIOUS would partially obscure sensitive data, they are drawn from a limited population and are thus, themselves, inherently guessable, although the guessing would require considerable effort on the part of the attacker, especially if the pseudo-SALT is randomly deployed throughout the source.

However, the principal purpose of including the earlier HASH_LINKEDs (i.e. HASH_PRIORs), in the form of pseudo-SALT, is not to defeat a brute force attack against the source. It is to defeat an attack against the hash chain itself as detailed below.

Where the pseudo-SALT elements are inserted into the source prior to hashing is entirely arbitrary and can be determined by each author for themselves. The elements do not even need to be kept together so could be scattered randomly throughout the source. It is, however, vital that the local client stores details of exactly how and where the pseudo-SALT was included so that when the client passes the Data (and pseudo-SALT) to a Relying Party, they can include instructions on how to combine it with the Data in order to re-create HASH_SALTED and verify its inclusion in the hash chain.

The HASH_PRIORs will be randomly selected from HASH_LINKEDs already published on the hash chain. Preferentially, selection will follow the rule that one of the HASH_PRIORs will be randomly selected from those added in the past 24 hours, preferably prior to the most recent print deadline, and one will be randomly selected from End of Day records prior to that publication.

It is important that the older HASH_PRIOR is explicitly selected from those published prior to the most recent print publication date as these are already impossible for the attacker to amend without detection.

The relevance of the 24 hour reference is as follows. The preferred Client will be a full P2P member of a user network. As such they will normally hold a local copy of that part of the hash chain published in the previous 24 hours, or at least as much of it as their local storage permits. The minimum useful storage would be whatever it takes to capture the previous few minutes' worth of new hash chain records, or 10,000 records, whichever is the greater.

In addition, Client Peers will store as many End of Day records as local storage permits. As it would only require less than two megabytes to store the daily records for about 100 years' worth of data there is no obvious reason why all such clients could not host all the End of Day records ever created. These records contain the HASH_LINKEDs which are identical to those appearing in the Printed Publications.

Optionally, Peers can also store all the Day Confirmation Records and all the Block Confirmation Records. This would ultimately entail a Peer storing approximately 1% of 1% of the full hash-chain (1 in 10,000 records).

The purposes of local P2P storage are threefold. First, in the event of their own registration of a new entry to the hash chain, it enables them to randomly select their HASH_PRIORs without reference to or the knowledge of potential attackers in control of the Server. Secondly, it allows them, both individually and collectively—by randomly comparing each other's entries—to verify entries on the Server's hash chain and thirdly, in the event of temporary loss of access to the Server, a limited form of the service could be provided by the P2P network.

For Clients unable or unwilling to participate in the P2P network, the recommended registration process will involve them downloading a recent slice of the hash chain, as required, in order to be able to select their HASH_PRIORs.

The slice will typically contain 10,000 recent records from the hash chain but will rarely constitute a "block" (see below) as its boundaries will nearly always cross block boundaries. The download to these partial clients will, ideally, also include two or three hundred End of Day records, but this may vary according to local bandwidth and traffic issues. The aim is to enable reasonably random selection of HASH_PRIORs not too easily guessable by an attacker. Those users who avoid even the recent slice (null clients) can still make random selections of their HASH_PRIORs but they cannot hide their choice from a potential attacker.

In all cases (full, partial and null Clients), after they logon to begin the process of creating and uploading a new hash set, and at the point they are ready to complete the hashing process, they will be allocated an HASH_PREVIOUS by the server from its pool of unallocated HASH_LINKEDs.

A primary role of the full or partial Client is to share data with the P2P network, concerning the performance and response times of the Server. This is described in more detail later (See "Protecting the Server with a Peer to Peer Network"). The important point here is that before attempting to submit new records to the Server, it will poll the P2P network for re-assurance that it is currently considered safe to proceed as there is no evidence that the Server is under attack.

Assuming it is safe to proceed, the software Client will, in all cases, compute the HASH_SOURCE for the source data. The first purpose being to check, within its local table of previous registrations, that the current source has not already been registered. Submission of the HASH_SOURCE to the server, however, is optional. There are a number of reasons why an author may not wish to publish the HASH_SOURCE.

Like the example above, the data might be confidential but from a limited plaintext set which could be easily brute-forced. Or the author might wish to ensure that anyone wishing to validate the data would be compelled to make contact with the author. That would be unnecessary if both the source and the HASH_SOURCE were published. But if the source is published while the HASH_SOURCE is not, then, if validation is required, it can only be performed by contacting the author or publisher to obtain the pseudo-SALT (and embedding instructions) required to perform full validation. Such restrictions might be useful, for example, in controlling access to new online accounts, or in commercial "Special Offers" or "Extras" which can only be claimed by direct contact with the seller, or in ensuring that only authorised entities are able to validate relevant data or that every attempt to validate relevant data is itself tracked and so on.

Conversely, the HASH_SALTED will always be uploaded if it is computed. However, allowance is made for the possibility that some authors may need to register a source but do not have the Client software available. And some applications may not require the protection afforded by the HASH_SALTED. For example photographers may wish to automatically provide proof of when the image was created for copyright purposes, rather than merely when it was registered on the hash chain. This requires a specialised use of the hash chain data involving a weaker form of HASH_SALTED which is described later (see "Proving Creation Time for Instantaneous Digital Capture Devices").

They would not need the protection provided by the use of normal HASH_SALTED, although they may still choose to use it as every use of HASH_SALTED adds to the overall protection of the hash chain. Data registered without HASH_SALTED will still be protected by the hash chain, but it provides no reciprocal protection to the hash chain.

The purpose of creating HASH_SALTED and using it to create the next HASH_LINKED in the hash chain is to make any direct attack on the hash chain impossible to hide for long enough for the attack to succeed for the purposes of deception. The only significant impact a direct attack on the hash chain could then achieve would be similar to denial of service, a disruption to normal service.

It is reasonable to assume that the purpose of most attacks would be to create and maintain a profitable deception which can be sustained long enough to trick a victim into compliance. Attacks motivated by other considerations (e.g., Denial of Service) are not the focus of this disclosure. They require other countermeasures. For the kind of internal forgery attack we are concerned about to succeed, we have to assume that the attacker has complete control of the server, and presumably one or more source documents or data whose content they need to amend in order to create the deception. Their purpose in the attacking the hash chain is to lend credibility to their amendment.

Prior to the present disclosure, such an attack against a journal protected hash chain or hash table would have been plausible on all the data added to the hash chain or hash table since the most recent print publication.

An attacker in control of such a hash chain Server could replace a selected existing HASH_SOURCE with one of their own and, as all the subsequent HASH_SOURCEs used to compile the hash chain are visible, they can recreate the chain. Even if an external observer suspected an attack they could not easily prove it.

As indicated above, there is a period of vulnerability between print publications, namely the period during which it is not yet entirely safe to trust the data confirmed by the chain. All hash chains and block-chains are vulnerable during that period.

As indicated above, for any given item, the period between its registration on the hash chain and the point at which it can be trusted is known in the field as Verification Latency.

With print publication, that period can be up to 24 hours. By way of contrast, Bitcoin Verification Latency is held to be between 6 and 60 minutes depending on the level of certainty the relying party requires for confidence in a given transaction.

These extended periods of uncertainty have previously rendered hash-based integrity protection unsuitable for many purposes, for example, high speed financial transactions.

The main benefit of this disclosure is the reduction of Verification Latency to a matter of seconds, which brings the technology within the scope of most financial transactions and even most authentication procedures which require real time validation. This dramatic reduction in Latency is achieved by switching from the use of HASH_SOURCEs to build the chain, to the use of HASH_SALTED.

This rapidly renders the attacker's task intractable and, as a direct consequence, renders the hash chain inherently more trustworthy in "real time".

Attackers may have access to the target Data they need to amend, and access to the hash chain, so we must assume they can still see all the (published) HASH_SOURCEs and HASH_SALTEDs, but they are no longer able to perform the necessary recalculation of the hash chain for any entries more than one or two links down the chain after the record they have successfully amended.

To understand why, let us start with the very next link in the chain—after the item the attacker has tried to change. Its own HASH_SALTED is unlikely to have been affected by the attack as the attacked HASH_LINKED is too close to it to have been used as either a HASH_PRIOR, or, unless registration rates are very low, too close for it to have been the HASH_PREVIOUS in the calculation of its own HASH_LINKED. So the attacker could successfully incorporate that HASH_SALTED into an attempt at recalculating the hash chain.

However, when the attacker moves on to the next HASH_SALTED in the chain, there is now a small probability that the original version of the HASH_LINKED they have just attacked could have been used as the HASH_PREVIOUS in calculating that HASH_SALTED.

Although they can still ignore that problem and recalculate the hash chain to include the next HASH_SALTED, there is also a small risk that anyone performing a verification of that part of the hash chain will fail and then raise a warning.

As we move further down the chain, the probability of hitting an HASH_SALTED which depends on one of the now amended HASH_LINKEDs rapidly rises to a value of 1 (certainty). Ironically, the lower the rate of registrations (the process of adding new records to the growing chain), the lower the number of potentially compromised HASH_SALTEDs before that probability reaches 1 (one).

So, given that in a period of low usage, registration would likely take less than a couple of seconds, if items were being registered at the rate of, say, one every five (5) seconds, the second HASH_SALTED the attacker encounters must have included the HASH_LINKED they have just amended, at which point their recalculation will fail unless they also have access to the relevant Source Data.

If, conversely, registrations are happening at the rate of a thousand per second, it is conceivable that the attacker may not encounter an HASH_SALTED dependent on their own attacked hash for perhaps a thousand new records.

The critical figure is the size of the pool or cache held by the server containing unallocated HASH_PREVIOUS records; which, in turn, is dependent only partially on the rate of registrations and the rate at which the Server can handle them. Modern servers have huge capacity (e.g., certain credit card transactions are currently being processed at the rate in excess of 200 million per day, over 2,000 per second). The likely bottleneck, however, is the rate at which the Clients will make use of the pool data. A HASH_PREVIOUS cannot be removed from the pool until the Server receives a completed record back from the Client (which confirms it has now been allocated and used) and the Client's response may be delayed arbitrarily by events taking place at the Client's end.

So the pool really reflects the number of "pending" registrations, where Clients have initiated registration but not yet completed them. In any case, whatever that number is, once the attacker has recreated an equal number of new links in the chain, they MUST be creating new links which will fail any attempt at validation.

This is because, not only does the attacker not know which HASH_PRIORs (or even HASH_PREVIOUS, though these are inherently more guessable) have been incorporated into the ongoing HASH_SALTEDs, but even if they did, they cannot perform the necessary recalculations on any source data to which they do not also have complete access and control (which will be most of the other data protected by the hash chain).

In recognition of the critical role of the size of the HASH_PREVIOUS pool, the Server will re-issue any HASH_PREVIOUS which has not yet been "consumed" by an ongoing registration within, say, 10 or 20 seconds.

This is because it does not matter how many times a HASH_PREVIOUS is incorporated into future HASH_SALTEDs. What matters is that they are ALL used and, preferably, used as quickly as possible, to restrict the attack window of opportunity. Hence if, for whatever reason, an ongoing registration is not completed within a few seconds, the Server will simply reissue the pending HASH_PREVIOUS to an alternative registration in the expectation that this re-iterative process will minimise the chances of any HASH_PREVIOUS remaining unused for more than a few seconds. This ensures that the attacker must strike the obstacle of a used HASH_PREVIOUS within the number of records produced in a similar period.

However, the fact that the attacker's modified hash chain will fail inspection only matters if the chain is inspected. And two further aspects of the disclosure ensure that inspections must take place AT LEAST at the same rate as registrations. First, no registration is concluded until the relevant slice of the chain, which includes the author's new record, has been inspected by the Client to ensure that the chain remains intact, usually from the record constituting the last published end of day record. Second, idle Clients, whose users approve, will regularly perform random checks of all parts of the chain.

At that point the author's submission is registered and can be considered "pending confirmation". It may not be considered "confirmed" until its own HASH_LINKED has been incorporated (as an HASH_PREVIOUS) into a later HASH_SALTED/LINKED record. This could be confirmed, on the server by the inclusion of the HASH_PREVIOUS in either the later record or linked metadata (see below), together with a mirror entry of the later HASH_LINKED in any relevant metadata for the author's pending record.

This step, or something similar, may be necessary in order to defeat an attack where one or more selected HASH_PREVIOUSs are deliberately withheld by the attacker with a view to making their attack on a target document easier by, for example, extending the amount of time they have for conducting the attack, or selectively withholding HASH_PREVIOUSs which they plan to incorporate into a modified entry. By ensuring that "confirmation" is dependent on recording the later incorporation, it would make it easy to set alarms which trigger if that confirmation takes more than the few seconds expected.

For full P2P clients, registration will typically involve a link test which begins with the most recent printed record (the previous End of Day record) and proceed through to the end of the chain.

As most of the data will already be held by the client, the client can intercept the growing chain—online—at any point to confirm that it still matches their own record, and that new records also conform. The offline portion of the check since the previous midnight will only take the Client a second or two.

Completing the online verification will take longer as it is subject to normal network latency and contention with other users, but with modern servers, checking the few hundred or thousand new records that may have been added since the latest Client update should still only take a few seconds.

Given that a successful system will also be subject to random arbitrary inspections by third parties seeking to validate data in the normal course of business, it is reasonable to conclude that, provided there is, at all times, even a relatively small number of active users (say, more than a few dozen), no such attempt to attack the hash chain could fail to be detected within a few seconds.

What this means is that no attack could succeed (in the sense of maintaining deception long enough to trick a victim) unless it was only necessary to maintain the deception for less than that few seconds. This rules out the vast majority of potential attacks as, if the Relying Parties are even remotely concerned about such a risk, all they have do is wait a few more seconds for P2P confirmation that no such attack is in progress, then re-check that their data still validates, before acting on whatever information it is that they have just validated.

Where even tighter time constraints on certainty are justified, collaborating Relying Parties (e.g., banks or stock traders) could arrange to coordinate a series of registrations and to share the results in real time, in order to prove that a particular transaction in the midst of such a series must have been lodged without successful attack and can therefore be trusted as soon as their shared results are mutually confirmed. The only speed limitations on such an arrangement are imposed by the physical infrastructure of the network and that implies (using the largest and most robust elements of the Internet currently available) that Verification Latency could be reduced, where it matters, to, at most, a few milliseconds.

Rapid Verification of Historical Records

This section explains how, in combination with the above procedures, a few more steps make it possible, subsequently, to verify the integrity of any data protected by any part of the chain within minutes, rather than days or weeks.

First we need to describe the confirmation records which will be added to the hash-chain at fixed intervals. In this description we will assume that fixed interval is every 10,000 records, though, as described below, the end of day, will also be treated as the end of an interval, so that each new day will begin with its first 10,000 records forming the first "block" of the day.

The 10,000 figure is not arbitrary, but represents our best guess at the size of block which could be downloaded on demand, in reasonable time (5-10 seconds), given reasonable bandwidth at the client end, and reasonable contention at the server end.

If conditions in practice suggest that 10,000 is too many or too few, a simple mechanism can be implemented to allow for the block size to be adjusted on a daily basis if necessary. For example, the first record of the day can include a reference to that day's block size.

The confirmation records will be created by the Server following a simple set of rules along the following lines:

1 As the 10,000th record is reached, the current HASH_LINKED is passed to a dedicated archiving routine on the Server which operates separately from the Server's most important routine, the hash-chain builder.

2 On receipt of that signal, the Archive routine will pass back to the hash-chain builder, the record it has already created of the previous block (assuming there is one, which will always be the case, once the chain is more than a block long). The hash-chain builder will add the record and return the new HASH_LINKED to the Archive routine, so it can be stored in its copy of the record. The point of this process is to avoid any delays to the operation of the hash-chain builder. It is conceivable that modern or future database architecture will render such separation of tasks unnecessary. Meanwhile the building of the archive record can take place while the next block is being built and will be ready to return to the chain-builder at the end of the next block, so that it can add the record as fast as any other.

3 The hash chain builder will make the record just received from the Archive routine the first record of the next block, unless the next block is the first block of a new day, in which case the first record will be the previous day's Confirmation Record (see below) and the block confirmation record will be the second record of the day. This is arbitrary. The order of the records could be reversed or otherwise determined. The important thing is that the rules determining position of confirmation records are fixed and known.

4 The Archive routine will now hash the copy of the new block it has made and create a new record, ready for the next block-end signal, which is made up, for example, as follows:
    4.1 The HASH_SOURCE will be the hash of the block.
    4.2 The HASH_PREVIOUS will be the HASH_LINKED from the end of the previous block.
    4.3 The HASH_PRIOR will be the HASH_LINKED from the end of the antepenultimate day (the previous but one day, or the day before yesterday).

The fact that an entire day's block confirmation records all use the same HASH_PRIOR poses no significant risk as the object is not obfuscation but entanglement with data old enough to be protected by a Printed Hash.
    4.4 Cryptographic SALT is clearly not required in this context, and the pseudo-SALT will always be added to the end of the block.
4.5 The block, with added pseudo-SALT will be hashed to create its HASH_SALTED
4.6 The new record is stored in a "Day-Block Table" which will be used, later, to create the Day Confirmation Record. Its HASH_LINKED is updated in the next cycle, when the record is submitted to the hash-chain builder and it returns the new cumulative hash.

5 The block and its pseudo-SALT will now be committed to multiple distributed WORM (Write One Read Many) drives for permanent immutable storage. Preferably, every server location or super-peer would make at least one WORM copy so that the archive is widely distributed.

6 The end of day procedure is slightly different. There is no need to create a separate archive or to hash the entire day's registrations as the individual blocks, apart from the last one of the day, have been archived and hashed separately.

The final block of the day is simply whatever has been added between the last archived block and midnight.

It is archived and hashed exactly like all the other blocks except that it will rarely contain exactly 10,000 records. Its confirmation record will, for example, become the first record of the second block of the new day.

The Day Confirmation record is created by the Archiving routine. It already has copies of all the block confirmation records for the day in its Day-Block Table.

On completion of the final block, adds its confirmation record to the Day-Block Table, checks all records are still in place within the hash chain and creates a new Confirmation record with rules along these lines:
    6.1 The HASH_SOURCE will be the hash of the Day-Block Table.
    6.2 The HASH_PREVIOUS will be the HASH_LINKED from the previous day end.
    6.3 The HASH_PRIOR will be the HASH_LINKED at the end of the day before that.
    6.4 as with normal blocks, No SALT is required, and the pseudo-SALT will always be added to the end of the data.
    6.5 The Day-Block Table, combined with its pseudo-SALT, will be hashed to create its HASH_SALTED.

That collection is also subsequently committed to WORM storage. The Day confirmation record is always stored in the hash chain in a fixed position such as the Second Record of the Second Block of the following day and, as stated in (3) above, the Day Confirmation record is also repeated as the first record of the next day.

Finally, separate Tables of End of Day Records and Day Confirmation Records are maintained, which hold copies of all End of Day and Confirmation Records to date. As each Day is concluded, a further Confirmation Record is generated for each of those tables and stored in another fixed location on the hash-chain, using the same HASH_PREVIOUS and HASH_PRIOR as the Day Confirmation Record.

This set of rules is arbitrary and more efficient versions might be possible. The object is to continue the entanglement of earlier elements of the chain into the new Confirmation records so that if an attacker succeeds in amending any entry they cannot also successfully recalculate the effects on the rest of the chain. The confirmation records constitute data about the hash chain itself, which any observer or user can confirm, for themselves, at any time. But what matters most is the speed with which such rules ensure that any record can be verified not just as being present within the hash chain, but within a block that can itself be verified by later records within the chain and that the process can be rapidly traced through to the current HASH_LINKED at the end of the chain.

The key consideration is that the rules are fixed and public, so that Client software or even sufficiently motivated humans can thoroughly test the links between individual records, blocks and days. In general, the procedure for verifying data protected by the hash chain involves the steps described below. Peers can also hold or create their own copies of the End of Day Table and Day Confirmation Record Table and check for themselves that their HASH_SALTEDs match those on the Server.

The data and metadata supplied to the Relying Party allows them (usually with the aid of the Client software, but without it, if necessary) to follow the rules above to carry out the following actions:
    1 Reconstruct the HASH-SALTED.
    2 Locate the HASH-SALTED on the hash-chain.
    3 Download the block in which it is embedded.
    4 Perform a thorough link-test on the block (see example in point 9 below).
    5 Hash the block to obtain its HASH_SOURCE.

6 Following the rules above, find its HASH_PREVIOUS and HASH_PRIOR.
7 Calculate its HASH_SALTED.
8 Locate that HASH_SALTED on the chain and confirm that it is where it should be (first record of the next but one block).
9 Perform a simple link test for the target record (previous block-end HASH_LINKED+Confirmation Record HASH_SALTED should hash to Confirmation Record HASH_LINKED), and, optionally, for a small random number of records before and after the target record.
10 Jump to the second record in the second block of the day, perform the link test, and (assuming it remains linked) store it as "Day 0 Confirmation Record".
11 Skip to the first record of the third block, perform the link test and store the record in a local Day-Block table of Confirmation records
12 Jump to the Confirmation record of the next block, test link, store record in local table.
13 Repeat till final block Confirmation record for that day is stored (taken from first record of second block of the following day).
14 Hash the local Day-Block table to obtain its HASH_SOURCE.
15 Using the rules above, find the matching HASH_PREVIOUS and HASH_PRIOR and use these to create its HASH_SALTED.
16 Locate that HASH_SALTED in the chain and confirm it is where it should be (second record, second block, next day).
17 Jump back to first record next day and confirm it matches DAY 0 Confirmation Record.
18 Jump back one record to the End of Day record and compare it to the Client Copy.
19 Optionally compare it to the actual print publication if available either in print or on other distributed databases.
20 When the block and its day records have passed such an inspection, the Client can, optionally, submit a "Block Confirmed" date-time record to the Server which will create a new record at the end of the Hash-Chain cross-referenced back to the relevant Block End record and marking a related record in a foreign table with its last confirmation date-time.

That reference to a "related record" is required as NO amendment is permitted to any record in the table holding the hash-chain as this would make any hash-check on the block itself fail any subsequent block validation test. But there is no significant risk in running a related "foreign" table alongside the hash-chain, whose own entries and changing states can be verified by the hash-chain, and which can hold such useful "metadata" as when the block was last confirmed. It is already envisaged that such related tables will be maintained not just internally, by the Server, but externally, by organisations making their own use of the hash-chain to verify their own data, such as ownership, expiry date, urls linking to whatever data the author wishes to make public, up to and including full Distributed Ledgers of the type offered by Block-Chains such as Bitcoin.

The final step, of recording the successful block confirmation by adding a new record to the hash chain, fulfils two purposes. The first is to record the block-end records' confirmation dates on an internal related table so the Client can, if the Relying Party permits it, perform one or two random additional Block confirmation tests, with an algorithmic preference for those blocks with no confirmation dates or those with relatively older dates. These additional checks would add perhaps a minute or so to the Relying Party's confirmation waiting time (which is why Clients may not always permit it) but perform a valuable task in obliging the attacker to change vast sections of the chain in order to maintain the illusion that it is unbroken. Each forced amendment dramatically increases the probability for rapid detection (by Relying Parties or Clients attempting to confirm those other parts of the chain).

The second purpose, however, is to duplicate the same security checks as are required for every other addition to the chain; which means that we have verified the Peer consensus is that the Server is functioning normally and not under current attack, and ensured that the Client has a clear end-point to aim at in the final stage of verification.

But even before that, assuming all the above tests have been passed, what has already been proved is as follows:
1 the Data Hashes still match the record in the Chain;
2 every other link in the block it is part of, remains intact as does every link in any other block fully tested;
3 The block/s still contain precisely the same data required to recreate any block confirmation records;
4 the relevant Day Confirmation Record still matches the reassembled block confirmation data for the day;
5 the End of Day record still matches the Client copy and—subject to an optional check—the print copy; and
6 the previous day's Confirmation Record is faithfully copied to the first record of the next day.

All of which means that if the Data we are trying to validate has been forged but still passes the above tests, there are only three ways this could be possible. First, and easiest, is that the Relying Party's Client has been diverted to looking at the wrong server. That can be prevented by arranging secure Client authentication based on proper enrolment, one time keys etc., which are well known in the field. With sufficient resources, the risk of that kind of misdirection can be virtually eliminated.

The second way would be if the attacker had managed to forge that entire section of the hash chain and was relying on no-one else performing validations on any other data registered on the same day (whose own attempt to validate would inevitably fail and generate an alarm—unless their own related source data had been subject to the same, and simultaneous, attack).

The strongest argument against this possibility would be that the Client copy of the End of Day record still matches. But if the attacker, or their accomplice, who passed the Data, to the Relying Party, also managed to embed some appropriate malware, they may have been able to spoof the local End of Day Record as well. Only by checking a securely sourced printed version could the Relying Party eliminate that possibility entirely, although it could be argued that cross checking that End of Day record with a random selection of other Peers would provide almost equivalent assurance and, in time, a random check of a sample of notarised records could also supply similar assurance. In any case, clearly the probability of a forgery passing these tests would already be minimal and, for most use cases, that level of confirmation might be deemed adequate.

The third possible way to spoof verification to the extent outlined above would be to replace the client software itself with a copy designed to achieve the results expected by the relying party. While this possibility cannot be discounted, and might work against a naïve victim, it should be the easiest to defend against. First, much of the testing can be carried out manually and, if only one or two steps are conducted like that, albeit purely to eliminate this possibility, the precaution would be sufficient. More robustly, the client will have its own hash recorded on the chain and that can be checked manually. Client parameters could be compared randomly with any other copy of the client to provide still further assurance. The malicious client, therefore, is not considered a serious threat.

However, the probability of spoofing can be further reduced by checking all the Day Confirmation Records (simple link test) and End of Day records (against the Client Copy) between the Data registration date and the current day. That should take no more than a further 10 to 60 seconds.

Note that, arbitrarily, any local client or user, as outlined for the Day-Block test, can take further optional digressions on their path through to the end of the chain in order to perform a few more arbitrary full block tests between the date of Registration and current date (e.g., to confirm public notarised data hashes). The attacker cannot know which parts of the chain they may choose to test, so to be sure their deception will succeed they would need to replace the entire chain simultaneously, and hope that no one else noticing the inevitable validation failures. This is an example of what is referred to in the field of digital security as "computationally infeasible" (effectively impossible). The only downside for the user is that each such random Block/Day test will take another 30 to 60 seconds.

Once the Client has arrived at the Current Day, the integrity check is complete, because, in the process of adding at least one block confirmation date-time record, the chain has already been validated from midnight (typically the publication time for end of day records) through to that new record. Assuming, therefore, that this final check confirms that the midnight HASH_LINKED remains as published, it is not possible that any links in the chain germane to the Data being validated can have changed since that Data was registered and, therefore, the Data itself has been conclusively verified as unchanged.

Protecting the Server with the Peer To Peer Network

This section describes the new functionality required for the P2P network to provide protection to the Server. It is not a description of new way to create such a network, rather than a new way to use it.

The primary function of the P2P network in relation to the Server is to share data between the peers, concerning the performance and response times of the Server, with a view to identifying any significant delays or blockages.

This is because the modifications to the hash chain described above leave only one serious option for an attacker, in control of the Server, to attempt a forgery. Given that they cannot recalculate revised hashes, following an attack, related to any data they do not control, they can only succeed by ensuring that they DO control all the data whose hashes will need changing during any attack.

This has two implications. First, that they must, for the duration of the attack, prevent any further additions to the hash-chain from any other sources; which, in turn, means they must interrupt normal service and block all the Client submissions from those sources. Detecting that overt suspension of normal service is the principal function of the P2P network.

The second implication is even more reassuring. They can only attack the end of the chain, because only at the end of the chain can they be sure of excluding source data they do not control.

Hence, P2P monitoring alone imposes a very tight time limit for any attack. Any response times more than double the current average will raise an alarm and, as normal response times should be in the order of a few seconds, the attacker starts with very little time to complete any attack. So if the peers, collectively, can confirm their ability to add new records (and to retrieve the results from the hash chain) they have proved that the Server is not currently under attack and that the hash chain can still be trusted. Furthermore, even a null client (one not participating in the P2P network, can achieve effectively instant assurance provided they can verify the details of ANY public notarised entry posted later than the actual HASH_LINKED they are seeking to validate. If those details are confirmed and they trust the source, and the link between the target hash and the notarised hash remain intact, they have justified a very high degree of confidence that the data is safe enough to trust.

The second function for the P2P network is to host all the End of Day records published in print, and, optionally, the Day Confirmation Records. Primarily, this gives them a much easier way to confirm any given day's data as described above. It also borrows from the distributed blockchain concept of "strength in numbers" and the protection of digital data by process of widespread distribution.

Just as important, however, is that by hosting their own copies of the End of Day records, when the client makes its random selection of one of those historical HASH_LINKED records for use as an historical HASH_PRIOR, no attacker in control of the Server can guess which one they have used. They would have to try them all.

And then they would have the even more difficult problem of guessing how the resulting pseudo-SALT was combined with the Source. And, of course, they also need access to the Source.

The third function is to host as many of those new records added in the past 24 hours (including the most recent printed End of Day HASH_LINKED) as they are willing or able to host. This has similar logic to hosting the End of Day records (protection by distribution, hiding choice of recent HASH_PRIOR) but also acts as a partial backup to the Server should it come under serious attack, not for the purpose of fraud, which this disclosure is primarily focussed upon, but for the purpose of disruption of service.

For example, the P2P network could provide a substitute service, albeit much slower, when the Server was under a sustained Denial of Service attack, at least for the purpose of providing validation of those recently added records. It could even help the Server rebuild its records if a significant attack actually managed to destroy recent data. (Historical data should be protected by the distributed WORM storage.)

The fourth function is to provide a regular check on the accuracy of the Server's Time-stamping performance. The Server will obtain or create trusted timestamps which should be as accurate as any on the Internet. However, an attacker might see an opportunity to profit by amending the timestamps to their advantage. The Client Peers will be supplied with a library of trusted timestamping authorities and users will have the option to add their own. At the beginning of any session with the Server, the Peer will request timestamps from one or more randomly selected timeservers. It will repeat the request on completion of the session. It will both feed its own "opinion" of the time to the Server as the session begins, and compare the Timestamps on consequent HASH_LINKEDs to the time data it has gathered elsewhere. A significant valiance will trigger an alarm. Similarly, the Server will raise an alarm with the Peer if the Peer's time data varies significantly from its own and other Peers' time data.

The fifth and final function performed by the P2P clients, subject to approval by their users, is to crawl the chain periodically, looking for unconfirmed blocks, or blocks which have not been confirmed for a while, or, if everything has been recently confirmed, randomly checking blocks anywhere in the chain, and to perform the block confirmation test described above on those blocks, creating new "Block Confirmed" records and updating their confirmation dates.

This continuous external check on the hash chain would provide a permanent obstacle to any attacker trying to alter any part of the chain without detection. It should ensure, even with only a few thousand peers, that the chain is being tested at least a few times per second which further curtails the opportunity for any attack to go undetected within seconds.

Proving Creation Time for Instantaneous Digital Capture Devices

Finally, this section describes an alternative use of the HASH_LINKEDs to prove a narrow time window in which certain kinds of data must have been created. While, in all cases, the HASH_LINKED of a registered item proves its latest possible creation time, it is possible in a limited set of circumstances also to prove the earliest possible creation time.

This further aspect of the disclosure enables Authors to generate a high level of confidence, approaching certainty, with regard to an exact, and usually narrow, time window in which a data-item was created, provided it was created, effectively instantaneously, by a device, such as a camera, with a bespoke version of the Client software embedded either in the device or in a communication device to which it is connected.

This involves entangling the most recent available HASH_LINKED with the data at the moment of its creation. In principle, any recent hash from the chain will do, though the more recent the better. So the preferred option is always to use the most current HASH_LINKED available.

The important point is to ensure that an image is entangled, at the point of creation, with a data item whose own date-time can be mathematically assured as a result of the operations described above.

Manufacturers may develop superior mechanisms to exploit this concept but one plausible option is to have the camera software encrypt the file space in which the image is about to be stored using the relevant HASH_LINKED as the key. Then, as soon as the image is complete, hash it and upload the hash, immediately, to the hash chain.

Provided the hardware implementation of that process is provably secure (by the manufacturer), then the author will be in a position to prove that the resultant image could not have been created either prior to the first HASH_LINKED it downloaded, or later than the subsequent HASH_LINKED created by the addition of its own new record, leaving a very small window of opportunity for manipulating the image itself.

With video footage, the window of opportunity is the same for a whole sequence of images but, given the additional option to construct an internal hash chain for each frame in the sequence, can be dramatically reduced for an individual frame. In short, in an appropriately modified camera, the disclosure confers a major opportunity for camera sourced data to prove its own integrity beyond reasonable doubt. It could eliminate the possibility that images have been doctored (other than by the camera itself) before publication, leaving only the possibility that what is revealed by the image is not real because it was "staged".

For those use cases where image integrity and proof of provenance really matters (e.g., photo journalism, security cameras, dash cams etc.) it is highly likely that a dedicated hash-chain will be created purely for image validation.

It may seem counter to the logic described above that this implies possibly thousands of simultaneously taken images all using the same HASH_LINKED. The shared use of the same hash is not a problem, either in this context or for normal data (see above reference to the reissue of pending HASH_PREVIOUSs).

It should be emphasised that the point of using the hash, in this instance, is only to prove the Author's data origin time, not to protect the hash chain; the critical point is that the exact time of creation of that HASH_LINKED can be proved, and hence, any and all images entangled with it can prove their earliest possible creation times.

Subsequently, their individual upload times will determine their provable latest possible creation times. Furthermore, to retain maximum speed on their dedicated chain, the Camera versions of the Client software could dispense with any further Hash inclusions and allow the "Image Hash Chain" to gain its own protection against internal attack by lodging periodic records (e.g., one for every ten thousand added images) in the "standard Hash Chain" using the full HASH_SALTED procedure.

It will be appreciated that the above described embodiments are given by way of example only and that various modifications thereto may be made without departing from the scope of the disclosure as defined in the appended claims. For example the embodiments described involve constructing hash chains by concatenation but other examples of construction, for example by bitwise exclusive or, or typically XOR, can envisaged. In addition the hash chain described herein is one dimensional but that is in anticipation of the need—for the foreseeable future—to implement the system described on what can be called a Super Peer Network. A Super Peer Network (SPN) here is one where, essentially, the entire hash-chain is set up as a searchable database and requires the SPN for practical purposes, chiefly large scale rapid multiple accesses where users will often require response times in "real time" (i.e. in no more than a few seconds). This does not preclude alternative hash-chain models such as Merkle Trees and Distributed Hash Trees, for example, which are optimised for standard peer to peer (p2p) networks but typically at the present time of 2017 require much longer response times (sometimes minutes rather than seconds). If communication technology permits sufficient increase in p2p bandwidth, an alternative option would be to switch to an entirely peer to peer system and achieve the same level of decentralisation as claimed by, for example, bitcoin. It should also be noted that the proposed SPN might itself decide that something like DHTs might be the most efficient way to share the data among themselves. Providing this can be done without destroying the ability to entangle the data and subsequently to verify it as described here, then such methods are entirely consistent with the method and apparatus described herein.

The invention claimed is:
1. A computer-implemented method of enabling validation of an integrity of data by reference to a plurality of unique data items ("HASH_LINKED") stored in a hash chain on at least one computing device, wherein the hash chain is produced at least by:
 (a) combining at least one HASH_LINKED already recorded on the hash chain with a newly added data source and hashing the resulting combination to produce a new hash ("HASH_SALTED");

(b) storing the HASH_SALTED in a new record of a database stored on the at least one computing device; and (c) combining, in the new record, the HASH_SALTED with a most recent HASH_LINKED and hashing the combination to produce a further HASH_LINKED stored to another field in the new record, such that a most recent HASH_SALTED and the further HASH_LINKED are permanently linked by position in the database, wherein (a) to (c) are repeated in multiple iterations, wherein following each repeat of (a), each most recent HASH_LINKED is combined with a succeeding HASH_SALTED in (c) and hashed to produce a succeeding further HASH_LINKED stored in the new record, and wherein the at least one HASH_LINKED already recorded on said hash chain is a record on the hash chain preceding the most recent HASH_LINKED, wherein the at least one HASH_LINKED comprises two HASH_PRIORs and a single HASH_PREVIOUS, wherein the two HASH_PRIORs each comprise any HASH_LINKED that has already been incorporated at least once into later HASH_SALTEDs, wherein the single HASH_PREVIOUS comprises a hash drawn from a collection of recently added HASH_LINKEDs which has not yet been combined with later sources to create new HASH_SALTEDs, wherein (a) combining at least one HASH_LINKED comprises (a) combining the two HASH_PRIORs, the single HASH_PREVIOUS, a SALT, and the newly added data source and hashing the resulting combination to produce the new HASH_SALTED, wherein at periodic intervals a BLOCK CONFIRMATION RECORD is created hashing a combination of a previous HASH_LINKED from a prior iteration and a file containing all records created since a previous BLOCK CONFIRMATION RECORD so as to create the HASH_SALTED to be stored in a pre-determined position within the hash chain, and wherein the value of the HASH_SALTED is combined with the most recent HASH_LINKED on the hash chain to produce a new most recent HASH_LINKED stored in the new record.

2. The method of claim 1, further comprising a verification wherein each successive HASH_LINKED is randomly verified in one or more of the following ways:

(i) by first agents seeking to authenticate arbitrary data items;

(ii) by second agents programmed to perform random verifications;

(iii) by third agents performing periodic or random verifications; or (iv) by fourth agents adding new records;

such that verification occurs at least at a same frequency as iterations of (a) to (c), and an alarm message is raised if the verification produces a negative result.

3. The method of claim 1, wherein the at least one HASH_LINKED already recorded on the hash chain is further combined with an instantaneously created data item, with the resulting combination being hashed to form the HASH_SALTED, which is in turn used to create the further HASH_LINKED in one or more hash chains, including the hash chain, at a first available opportunity.

4. The method of claim 1, wherein each HASH_LINKED is incorporated at least once into a successive HASH_SALTED later in the hash chain.

5. The method of claim 1, wherein each HASH_SALTED further includes a short string of random data.

6. The method of claim 1, wherein the hash chain includes a linked dataset that comprises a concatenated dataset.

7. A non-transitory computer-readable storage medium comprising instructions that, when executed by one or more processors, cause the one or more processors to enable validation of an integrity of data by reference to a plurality of unique data items ("HASH_LINKED") stored in a hash chain, and to produce the hash chain at least by:

(a) combining at least one HASH_LINKED already recorded on the hash chain with a newly added data source and hashing the resulting combination to produce a new hash ("HASH_SALTED");

(b) storing the HASH_SALTED in a new record of a database stored on the at least one computing device; and (c) combining, in the new record, the HASH_SALTED with a most recent HASH_LINKED and hashing the combination to produce a further HASH_LINKED stored to another field in the new record, such that a most recent HASH_SALTED and the further HASH_LINKED are permanently linked by position in the database, wherein (a) to (c) are repeated in multiple iterations, and wherein following each repeat of (a), each most recent HASH_LINKED is combined with a succeeding HASH_SALTED in (c) and hashed to produce a succeeding further HASH_LINKED stored in the new record, and wherein the at least one HASH_LINKED already recorded on said hash chain is a record on the hash chain preceding the most recent HASH_LINKED, wherein the at least one HASH_LINKED comprises two HASH_PRIORs and a single HASH_PREVIOUS, wherein the two HASH_PRIORs each comprise any HASH_LINKED that has already been incorporated at least once into later HASH_SALTEDs, wherein the single HASH_PREVIOUS comprises a hash drawn from a collection of recently added HASH_LINKEDs which has not yet been combined with later sources to create new HASH_SALTEDs, wherein (a) combining at least one HASH_LINKED comprises (a) combining the two HASH_PRIORs, the single HASH_PREVIOUS, a SALT, and the newly added data source and hashing the resulting combination to produce the new HASH_SALTED, wherein at periodic intervals a BLOCK CONFIRMATION RECORD is created by hashing a combination of a previous HASH_LINKED from a prior iteration and a file containing all records created since a previous BLOCK CONFIRMATION RECORD so as to create the HASH_SALTED to be stored in a pre-determined position within the hash chain, and wherein the value of the HASH_SALTED is combined with the most recent HASH_LINKED on the hash chain to produce a new most recent HASH_LINKED stored in the new record.

8. An apparatus comprising a storage device containing a plurality of data sources, an input via which data content of the data sources can be added to the storage device, a processor programmed to convert the data content of the data sources by reference to a plurality of unique data items ("HASH_LINKED") stored in a hash chain, and to produce the hash chain at least by being programmed to:

(a) combine at least one HASH_LINKED already recorded on the hash chain with a newly added data source and hashing the resulting combination to produce a new hash ("HASH_SALTED");

(b) store the HASH_SALTED in a new record of a database stored in the plurality of data sources on the storage device; and (c) combine, in the new record, the HASH_SALTED with a most recent HASH_LINKED and hashing the combination to produce a further HASH_LINKED stored to another field in the new record, such that a most recent HASH_SALTED and the further HASH_LINKED are permanently linked by position in the database, wherein (a) to (c) are repeated in multiple iterations, and wherein following each repeat of (a), each most recent HASH_LINKED is combined with a succeeding HASH_SALTED in (c) and hashed to produce a succeeding further HASH_LINKED stored in the new record, and wherein the at least one HASH_LINKED already recorded on said hash chain is a record on the hash chain preceding the most recent HASH_LINKED, wherein the at least one HASH_LINKED comprises two HASH_PRIORs and a single HASH_PREVIOUS, wherein the two HASH_PRIORs each comprise any HASH_LINKED that has already been incorporated at least once into later HASH_SALTEDs, wherein the single HASH_PREVIOUS comprises a hash drawn from a collection of recently added HASH_LINKEDs which has not yet been combined with later sources to create new HASH_SALTEDs, wherein (a) combining at least one HASH_LINKED comprises (a) combining the two HASH_PRIORs, the single HASH_PREVIOUS, a SALT, and the newly added data source and hashing the resulting combination to produce the new HASH_SALTED, wherein at periodic intervals a BLOCK CONFIRMATION RECORD is created by hashing a combination of a previous HASH_LINKED from a prior iteration and a file containing all records created since a previous BLOCK CONFIRMATION RECORD so as to create the HASH_SALTED to be stored in a pre-determined position within the hash chain, and wherein the value of the HASH_SALTED is combined with the most recent HASH_LINKED on the hash chain to produce a new most recent HASH_LINKED stored in the new record.

9. The method according to claim 1, wherein the newly added data source comprises captured digital content.

* * * * *